T. J. KINCAID.
WHEELED RAKE.
APPLICATION FILED MAY 28, 1919.

1,328,156.

Patented Jan. 13, 1920.

Inventor
T. J. Kincaid
By D. Swift
his Attorney

UNITED STATES PATENT OFFICE.

THOMAS J. KINCAID, OF WILLS, WISCONSIN.

WHEELED RAKE.

1,328,156.  Specification of Letters Patent.  Patented Jan. 13, 1920.

Application filed May 28, 1919. Serial No. 300,251.

*To all whom it may concern:*

Be it known that I, THOMAS J. KINCAID, a citizen of the United States, residing at Wills, in the county of Bayfield, State of Wisconsin, have invented a new and useful Wheeled Rake; and I do hereby declare the following to be a full, clear, and exact description of the invention, such as will enable others skilled in the art to which it appertains to make and use the same.

The invention relates to wheeled rakes and grass destroyers and has for its object, to provide a wheeled rake of the sulky type on which the operator of the machine may ride and to provide rearwardly extending pivoted arms, the rear ends of said arms being provided with a series of toothed bars, and to provide means on the sulky within easy and convenient reach of the operator whereby the rake bars may be raised or lowered as desired.

A further object is to provide the tooth bars with a series of teeth, said teeth being so alined that the teeth of one bar will be disposed in such a position as to engage the ground at a point between the teeth of the adjacent bars.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
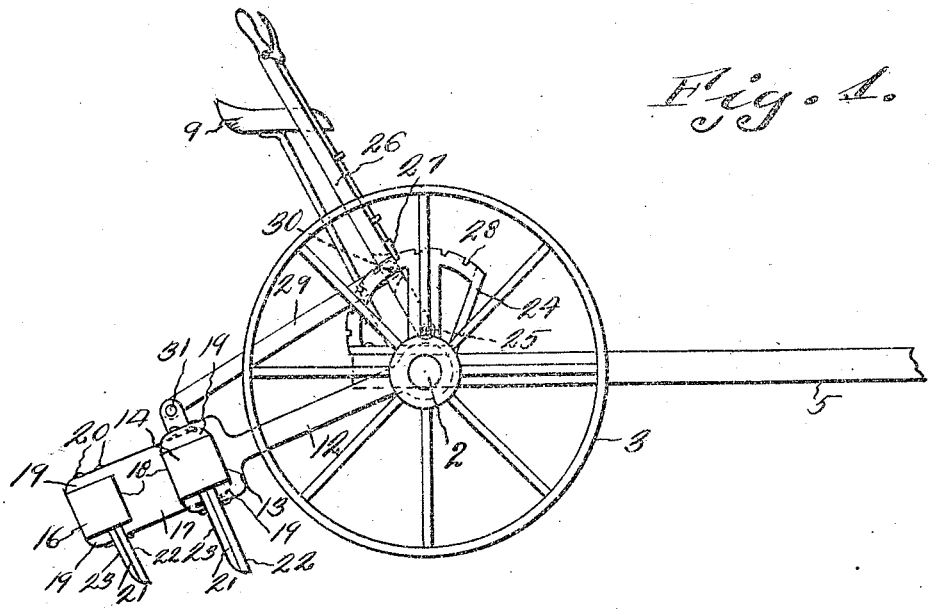
Figure 1 is a side elevation of the wheeled rake.
Figure 2:
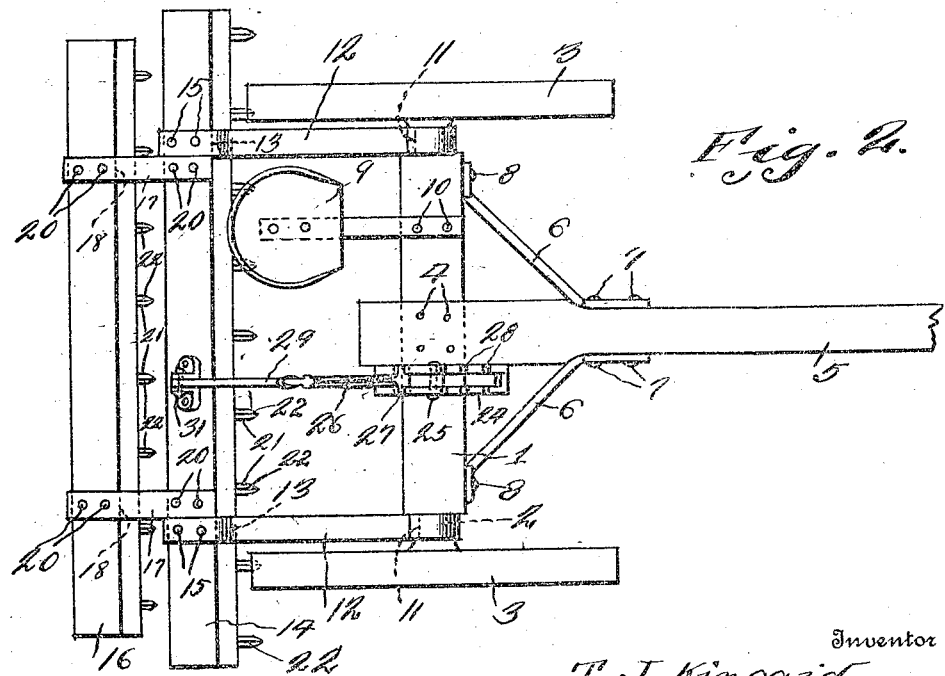
Fig. 2 is a top plan view of the machine.
Figure 3:
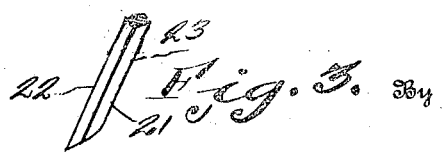
Fig. 3 is a perspective detail view of one of the teeth.

Referring to the drawings, the numeral 1 designates a conventional form of bolster which may have secured thereto in any suitable manner an axle 2, said axle having rotatably mounted on the ends thereof wheels 3. Secured by means of rivets 4 to the bolster 1 is a tongue 5, there being braces 6 secured as at 7 and 8 to the tongue and bolster for bracing the tongue. A seat 9 is secured as at 10 to the bolster 1, and is adapted to be occupied by the operator of the machine.

Pivotally mounted on the axle 2, as at 11 are rearwardly extending arms 12, the rear end of said arms being bifurcated as at 13 and secured in said bifurcations is a tooth bar 14, there being rivets 15 passing through the arms formed by said bifurcations and the bar 14, thereby securely holding said bar in the bifurcations. A second toothed bar 16 is provided and is held spaced from the bar 14 by means of the spacing blocks 17, said blocks being bifurcated as at 18 thereby forming arms 19. The bars 14 and 16 are disposed in said bifurcations 18 and rivets 20 pass through said arms and said bars thereby rigidly securing the bars together in alinement with each other and radially of the center of the axle.

Bars 14 and 16 are provided with downwardly and forwardly extending teeth 21, which teeth have their forward edges sharp as shown at 22 and their rear surfaces convexed as shown at 23. By this construction of the tooth the diamond shaped edge 22 will cut through the ground and offer the least resistance thereto. The teeth of one bar are so positioned as not to register with the teeth of the other bar, thereby preventing the teeth of the various bars from traveling in the same groove formed in the ground.

Secured to the bolster 1 is a toothed rack 24 and pivotally secured as at 25 to said toothed rack is a lever 26, said lever being provided with a dog 27, which dog is adapted to be received by any of the notches 28 in the segmental rack and maintain said lever in any position in which the same may be placed. A connecting bar 29 has one of its ends connected to the lever 26 as at 30, while its other end is pivotally secured as at 31 to the toothed bar 14. When it is desired to raise or lower the toothed bars all that will be necessary is to move the lever 26 until the toothed bars assume the position desired.

It will be noted that the bars are in radial position relative to the center of the axle and that by increasing the number of teeth the rake may be used for destroying and raking up roots of quack grass, corn stubble, or any other similar material which is desired to be removed from the soil, also that the machine may be used for cultivating young corn and other kinds of crops.

The invention having been set forth what is claimed as new and useful is:—

1. A wheeled rake comprising a body member, an axle carried by said body member, wheels rotatably mounted on the ends of said axle, a rake disposed to the rear of said body member, said rake comprising a pair of toothed bars secured together, connecting bars having one of their ends bifurcated and adapted to receive the forward rake bar, said forward rake bar being secured in said bifurcation, the other ends of the connecting bars being pivotally secured to the axle, said connecting bars and toothed rake bars being in radial position to said axle and means carried by the body member and connected to the forward toothed bar whereby the rake as a whole may be raised or lowered as desired.

2. A rake comprising a body member having wheels thereon, said wheels being rotatably mounted on the ends of an axle, a series of toothed rake bars disposed to the rear of the body member, said teeth on the rake bars being in staggered relation to each other, said rake bars being secured together and held spaced apart by spacing blocks, having bifurcated ends in which the rake bars are secured, connecting bars having one of their ends bifurcated and adapted to receive the forward rake bar, said forward rake bar being secured in said bifurcations, the other ends of the connecting bars being pivotally secured to the axle, said connecting bars and toothed rake bars being in radial position to said axle and means carried by the body member and connected to the forward toothed bar whereby the rake as a whole may be raised or lowered as desired.

In testimony whereof I have signed my name to this specification in the presence of two subscribing witnesses.

THOMAS J. KINCAID.

Witnesses:
P. J. SAVAGE,
E. G. HEDQUIST.